United States Patent
Frisinger et al.

(10) Patent No.: US 11,321,804 B1
(45) Date of Patent: May 3, 2022

(54) TECHNIQUES FOR FLEXIBLE RENDERING OPERATIONS

(71) Applicant: QUALCOMM Incorporated, San Diego, CA (US)

(72) Inventors: Thomas Edwin Frisinger, Shrewsbury, MA (US); Richard Hammerstone, Tyngsboro, MA (US); Jonnala Gadda Nagendra Kumar, San Diego, CA (US); Avinash Seetharamaiah, San Diego, CA (US); Shangmei Yu, Sunnyvale, CA (US); Srihari Babu Alla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/071,888

(22) Filed: Oct. 15, 2020

(51) Int. Cl.
| | |
|---|---|
| *G06T 1/20* | (2006.01) |
| *G06T 15/00* | (2011.01) |
| *G06T 1/60* | (2006.01) |
| *G06F 9/48* | (2006.01) |

(52) U.S. Cl.
CPC .............. *G06T 1/20* (2013.01); *G06F 9/4843* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 6,104,417 A | * | 8/2000 | Nielsen | G06F 12/1081 345/502 |
| 2008/0141131 A1 | * | 6/2008 | Cerny | G06F 9/45516 715/716 |
| 2013/0135341 A1 | * | 5/2013 | Seetharamaiah | G06T 15/005 345/619 |
| 2014/0333657 A1 | * | 11/2014 | Volotinen | G06T 15/503 345/592 |
| 2015/0379669 A1 | * | 12/2015 | Venkatesh | G06T 1/20 345/522 |
| 2016/0364898 A1 | * | 12/2016 | Poddar | G06T 15/04 |

* cited by examiner

*Primary Examiner* — Joni Hsu
(74) *Attorney, Agent, or Firm* — Holland & Hart LLP

(57) ABSTRACT

Methods, systems, and devices for graphics processer unit (GPU) operations are described. A device may monitor one or more states of a GPU during a duration. Based on monitoring the one or more GPU states, the device may determine an execution of a GPU command that is common to at least two GPU operations for clearing the GPU buffer. The device may determine whether the GPU clear command has previously been executed during a duration or a GPU cycle in which the device monitored the GPU states. The device may process the GPU clear command based on the determination of whether the GPU clear command has previously been executed. For example, the device may drop the GPU clear command based on the determination or modify a portion of the GPU clear command and execute at least the modified portion of the GPU clear command.

20 Claims, 9 Drawing Sheets

TECHNIQUES FOR FLEXIBLE RENDERING OPERATIONS

TECHNICAL FIELD

The following relates generally to processing, and more specifically to techniques for flexible rendering operations.

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

SUMMARY

Some multimedia systems may use a graphics processing unit (GPU) to render and display various types of multimedia communication content. A GPU may represent one or more dedicated processors for performing graphical operations. For example, the GPU may be a dedicated hardware unit having fixed function and programmable components for rendering graphics and executing GPU applications. In some cases, a GPU driver may determine components such as hardware engines for clearing a GPU buffer. However, in some cases, this determination may result in unnecessary added overhead at the GPU driver. Techniques for generating the clear commands while minimizing overhead at the GPU driver are desired.

The described techniques relate to improved methods, systems, devices, and apparatuses that support techniques for flexible rendering operations (also referred to herein as unified flexrender clear techniques and operations). A device may manage GPU commands using a model (e.g., a state machine) to monitor one or more GPU states (e.g., GPU render states, GPU clear states) during a time period or duration. Based on monitoring the one or more GPU states, the device may determine an execution of a GPU command that is common to at least two GPU operations for clearing a GPU buffer. The GPU command may be a GPU clear command (also referred to herein as a clear command) for clearing information temporarily stored in one or more locations of the GPU buffer. The device may determine whether the GPU clear command has previously been executed during a duration or a GPU cycle in which the device monitored the GPU states (e.g., GPU render states, GPU clear states). The device may process the GPU clear command based on the determination of whether the GPU clear command has previously been executed. In an example, the device may determine that the GPU clear command has previously been executed during the duration (or GPU cycle) in which the device monitored one or more GPU states (e.g., GPU render states, GPU clear states). The device may drop (e.g., skip execution of) the GPU clear command based on the determination. In some cases, based on the determination, the device may modify a portion of the GPU clear command and execute at least the modified portion of the GPU clear command.

A method of GPU operations at a device is described. The method may include identifying a set of GPU states of a GPU of the device, where the set of GPU states includes one or more of a GPU render state or a GPU clear state that corresponds to a set of commands for clearing a GPU buffer of the GPU, monitoring one or more of the GPU render state or the GPU clear state during a duration, determining, based on the monitoring, an execution of a command of the set of commands for clearing the GPU buffer during the duration, where the command is common to at least two GPU operations for clearing the GPU buffer, and processing the command based on determining.

An apparatus for GPU operations is described. The apparatus may include a processor, memory coupled with the processor, and instructions stored in the memory. The instructions may be executable by the processor to cause the apparatus to identify a set of GPU states of a GPU of the apparatus, where the set of GPU states includes one or more of a GPU render state or a GPU clear state that corresponds to a set of commands for clearing a GPU buffer of the GPU, monitor one or more of the GPU render state or the GPU clear state during a duration, determine, based on the monitoring, an execution of a command of the set of commands for clearing the GPU buffer during the duration, where the command is common to at least two GPU operations for clearing the GPU buffer, and process the command based on determining.

Another apparatus for GPU operations is described. The apparatus may include means for identifying a set of GPU states of a GPU of the apparatus, where the set of GPU states includes one or more of a GPU render state or a GPU clear state that corresponds to a set of commands for clearing a GPU buffer of the GPU, monitoring one or more of the GPU render state or the GPU clear state during a duration, determining, based on the monitoring, an execution of a command of the set of commands for clearing the GPU buffer during the duration, where the command is common to at least two GPU operations for clearing the GPU buffer, and processing the command based on determining.

A non-transitory computer-readable medium storing code for GPU operations at a device is described. The code may include instructions executable by a processor to identify a set of GPU states of a GPU of the device, where the set of GPU states includes one or more of a GPU render state or a GPU clear state that corresponds to a set of commands for clearing a GPU buffer of the GPU, monitor one or more of the GPU render state or the GPU clear state during a duration, determine, based on the monitoring, an execution of a command of the set of commands for clearing the GPU buffer during the duration, where the command is common to at least two GPU operations for clearing the GPU buffer, and process the command based on determining.

In some examples of the method, apparatuses, and non-transitory computer-readable medium described herein, determining the execution of the command may include operations, features, means, or instructions for determining a previous execution of the command during the duration, where processing the command may be based on determining the previous execution of the command during the duration.

In some examples of the method, apparatuses, and non-transitory computer-readable medium described herein, processing the command may include operations, features, means, or instructions for dropping the command based on determining the previous execution of the command during the duration.

Some examples of the method, apparatuses, and non-transitory computer-readable medium described herein may further include operations, features, means, or instructions for determining a render mode associated with the GPU render state, the render mode including a binning render mode or a direct render mode, where processing the command may be based on the render mode.

In some examples of the method, apparatuses, and non-transitory computer-readable medium described herein, processing the command may include operations, features, means, or instructions for clearing the GPU buffer based on determining a set of rendering boundaries.

In some examples of the method, apparatuses, and non-transitory computer-readable medium described herein, processing the command may include operations, features, means, or instructions for clearing the GPU based on aligning two or more bins associated with the GPU buffer.

In some examples of the method, apparatuses, and non-transitory computer-readable medium described herein, determining the execution of the command may include operations, features, means, or instructions for determining a nonexecution of the command during the duration, where processing the command may be based on determining the nonexecution of the command during the duration.

In some examples of the method, apparatuses, and non-transitory computer-readable medium described herein, processing the command may include operations, features, means, or instructions for modifying a portion of the command based on determining the nonexecution of the command during the duration, and executing at least the modified portion of the command.

Some examples of the method, apparatuses, and non-transitory computer-readable medium described herein may further include operations, features, means, or instructions for determining a set of clear parameters associated with the set of commands for clearing the GPU buffer based on one or more of the GPU render state or the GPU clear state, where modifying the portion of the command may be based on the set of clear parameters.

In some examples of the method, apparatuses, and non-transitory computer-readable medium described herein, the set of commands for clearing the GPU buffer include one or more of a clear region, a clear color, or a format associated with clearing the GPU buffer.

Some examples of the method, apparatuses, and non-transitory computer-readable medium described herein may further include operations, features, means, or instructions for determining a clear command type associated with the command, where processing the command may be based on the clear command type.

In some examples of the method, apparatuses, and non-transitory computer-readable medium described herein, the at least two GPU operations for clearing the GPU buffer include a clear on resolve operation.

DETAILED DESCRIPTION

Figure 1:
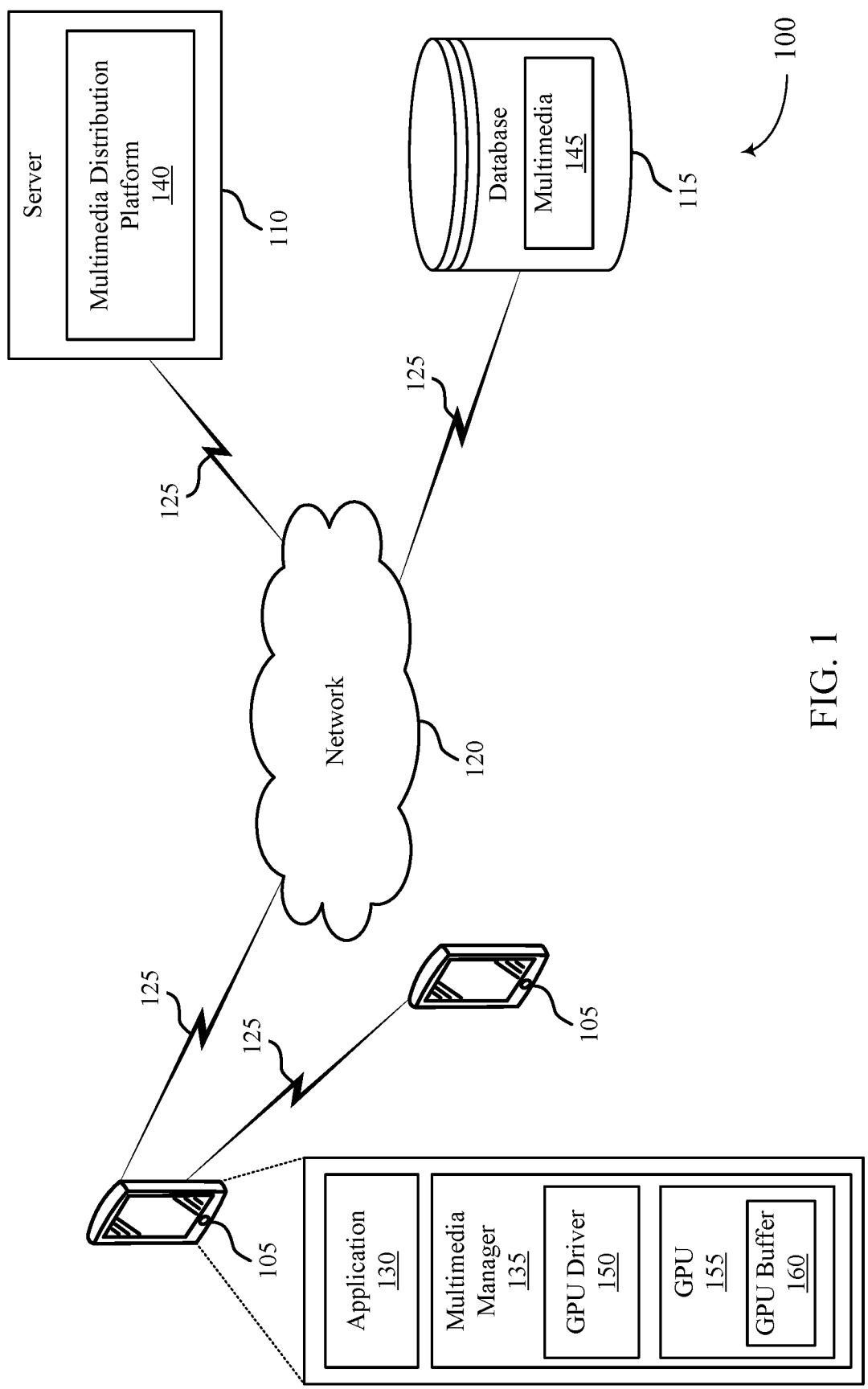
FIG. 1 illustrates an example of a multimedia system that supports techniques for flexible rendering operations in accordance with aspects of the present disclosure.

A device may be configured with one or more processors, such as a GPU to support various graphics related applications. A GPU may be a dedicated hardware unit having fixed function and programmable components for rendering graphics and executing GPU applications. A GPU driver may determine hardware components such as hardware engines (e.g., a two-dimensional (2D) engine, a three-dimensional (3D) engine, or a resolve engine) for clearing a GPU buffer of the GPU. For example, the GPU driver may determine which of the engines to use based on properties associated with clearing the GPU buffer. In some cases, the GPU driver may also generate instructions for the GPU, such as clear commands for clearing the GPU buffer. The GPU may execute the clear commands using one or more components to clear the GPU buffer to improve GPU operations. The GPU buffer may be referred to as a command buffer or a GPU command buffer.

In some cases, determining software and hardware components, as well as clear commands for clearing the GPU buffer, may result in unnecessary added overhead at the GPU driver. For example, determining which engine (and associated clear commands) to use may be dependent on a current rendering state of the GPU, which may depend on a rendering mode set by the GPU driver for the GPU. However, in some cases, the rendering mode for the GPU may not be determined by the GPU driver until relatively later compared to when the GPU determines which engine (and associated clear commands) to use. Accordingly, in some devices, a disconnect is present in programming a clear command without first knowing the rendering mode based on which to program the clear command.

Some techniques may defer creating clear commands until the rendering mode of the GPU is determined, which may result in increased driver overhead when submitting the clear commands to the GPU buffer. Some other techniques may store a relatively large quantity of conditional clear commands in the GPU buffer, in which the conditional clear commands each correspond to parameters associated with a render mode of the GPU. Accordingly, in some cases, the GPU executes a single one of the conditional clear commands based on the render mode of the GPU. However, such techniques may result in increased driver overhead associated with creating the conditional clear commands (e.g., code) at the GPU driver. In some cases, the techniques may result in increased overhead at the command processor (e.g., GPU buffer) due to parsing the code. Improved techniques for a clearing a GPU buffer while reducing overhead associated with hardware and software resources of the GPU driver and the GPU buffer are desired.

Various techniques of the present disclosure relate to processing GPU commands for a GPU buffer. According to the example techniques described herein, a device may manage GPU commands using a model (e.g., a state machine) to monitor one or more GPU states during a time period or duration. The GPU states may include, for example, GPU render states, GPU clear states, or a combination thereof. Based on monitoring (e.g., tracking) the one or more GPU states, the device may determine an execution of a GPU command that is common to at least two GPU operations for clearing the GPU buffer. For example, the device may determine whether a GPU clear command associated with a GPU operation has previously been executed in association with another GPU operation. The GPU command may be a GPU clear command (also referred to herein as a clear command) for clearing information temporarily stored in one or more locations of the GPU buffer.

The GPU clear command may be a clear command (e.g., a direct rendering clear command) associated with a direct rendering mode. In some examples, the GPU clear command may be a clear command (e.g., a bin rendering clear command) associated with a binning rendering mode, which may also be referred to as a tile-based rendering mode. The device may determine whether the GPU clear command has previously been executed during a duration or a GPU cycle in which the device monitored the GPU states (e.g., GPU render states, GPU clear states). The device may process the GPU clear command based on the determination of whether the GPU clear command has previously been executed.

The device may determine that the GPU clear command has previously been executed during the duration (or GPU cycle) in which the device monitored one or more GPU states (e.g., GPU render states, GPU clear states). The device may drop the GPU clear command based on the determination. For example, the device may skip execution of the GPU clear command. In some examples, for a GPU clear command associated with a GPU operation, the device may skip execution of the GPU clear command based on determining the GPU clear command has already been executed by the GPU in another GPU operation (e.g., in a clear on resolve operation). In some other examples, the device may determine that the GPU clear command has not been executed during the duration (or GPU cycle) in which the device monitored one or more GPU states (e.g., GPU render states, GPU clear states).

The device may modify a portion of the GPU clear command based on determining the GPU clear command has not been executed. In some examples, for a GPU clear command associated with a GPU operation, the device may modify a portion of the GPU clear command based on determining the GPU clear command has not been executed by the GPU in another GPU operation (e.g., in a clear on resolve operation). The device may modify the portion of the GPU clear command based on clear parameters associated with the GPU clear command. In some examples, the device may modify the portion of the GPU clear command based on a rendering mode (e.g., binning rendering mode, direct rendering mode) associated with the monitored GPU states (e.g., the GPU render state). The device may execute at least the modified portion of the GPU clear command.

Aspects of the disclosure are initially described in the context of a multimedia system. Examples of processes and devices illustrating aspects of the discussed techniques are then described. Aspects of the disclosure are further illustrated by and described with reference to apparatus diagrams, system diagrams, and flowcharts that relate to adaptive dispatch techniques for flexible rendering operations (also referred to herein as unified flexrender clear).

FIG. 1 illustrates a multimedia system 100 for a device 105 that supports techniques for flexible rendering operations in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports adaptive dispatch techniques for flexible rendering operations, such as multimedia packets, multimedia data, or multimedia control information, via network 120 using communications links 125. In some cases, a portion or all of the techniques described herein supporting flexible rendering operations may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115. The multimedia manager may include a GPU driver 150, a GPU 155, and a GPU buffer 160. The GPU buffer 160 may be included in or referred to as a GPU memory (also referred to herein as a graphics memory (GMEM)). Examples of aspects of the GPU driver 150, the GPU 155, and the GPU buffer 160 are described with reference to FIG. 2.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support flexible rendering operations, according to the techniques described herein.

The device 105 may identify a set of GPU states of a GPU 155 of the device 105. The set of GPU states may include one or more of a GPU render state or a GPU clear state that corresponds to a set of commands for clearing the GPU buffer 160 of the GPU 155. The device 105 may monitor one or more of the GPU render state or the GPU clear state during a duration. The device 105 may determine, based on the monitoring, an execution of a command of the set of commands for clearing the GPU buffer 160 during the duration, where the command is common to at least two GPU operations for clearing the GPU buffer 160. The device 105 may process the command based on the determining.

The device 105 may drop (e.g., skip execution of) the command based on determining the command has previously been executed during the duration. For example, where the command is associated with a GPU operation, the device 105 may skip execution of the command based on determining the command has already been executed by the GPU 155 in another GPU operation (e.g., in a clear on resolve operation). In some other cases, the device 105 may modify a portion of the command based on determining the command has not been executed. The device 105 may execute at least the modified portion of the command. For example, where the GPU clear command is associated with a GPU operation, the device 105 may modify a portion of the command based on determining the command has not been executed by the GPU 155 in another GPU operation (e.g., in a clear on resolve operation).

The multimedia system 100 may provide improvements in adaptive dispatch techniques for flexible rendering operations. Furthermore, the multimedia system 100 may provide benefits and enhancements to the operation of the devices 105. For example, by dropping a command (e.g., skipping execution of the command) based on whether the command has already been executed, overhead at the GPU 155 of the device 105 may be reduced, and the operational characteristics, such as power consumption, processor utilization (e.g., DSP, CPU, GPU 155, ISP processing utilization), and memory usage of the device 105 may be reduced. In some other aspects, by modifying a portion of the command based on clear parameters or a rendering mode (e.g., binning rendering mode, direct rendering mode) associated with the command, overhead at the GPU 155 of the device 105, the operational characteristics (e.g., power consumption, processor utilization, memory usage) of the device 105, or both may be reduced. By dropping (e.g., skipping execution of) or modifying a command for clearing the GPU buffer 160, the device 105 may reduce latency associated with the GPU buffer 160 processing time, for example, in association with flexible rendering operations. In some cases, the multimedia system 100 may also provide for reduced overhead at the GPU driver 150.

The server 110 may be a data server, a cloud server, a server associated with a multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support adaptive dispatch techniques for flexible rendering operations associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The wireless communications links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
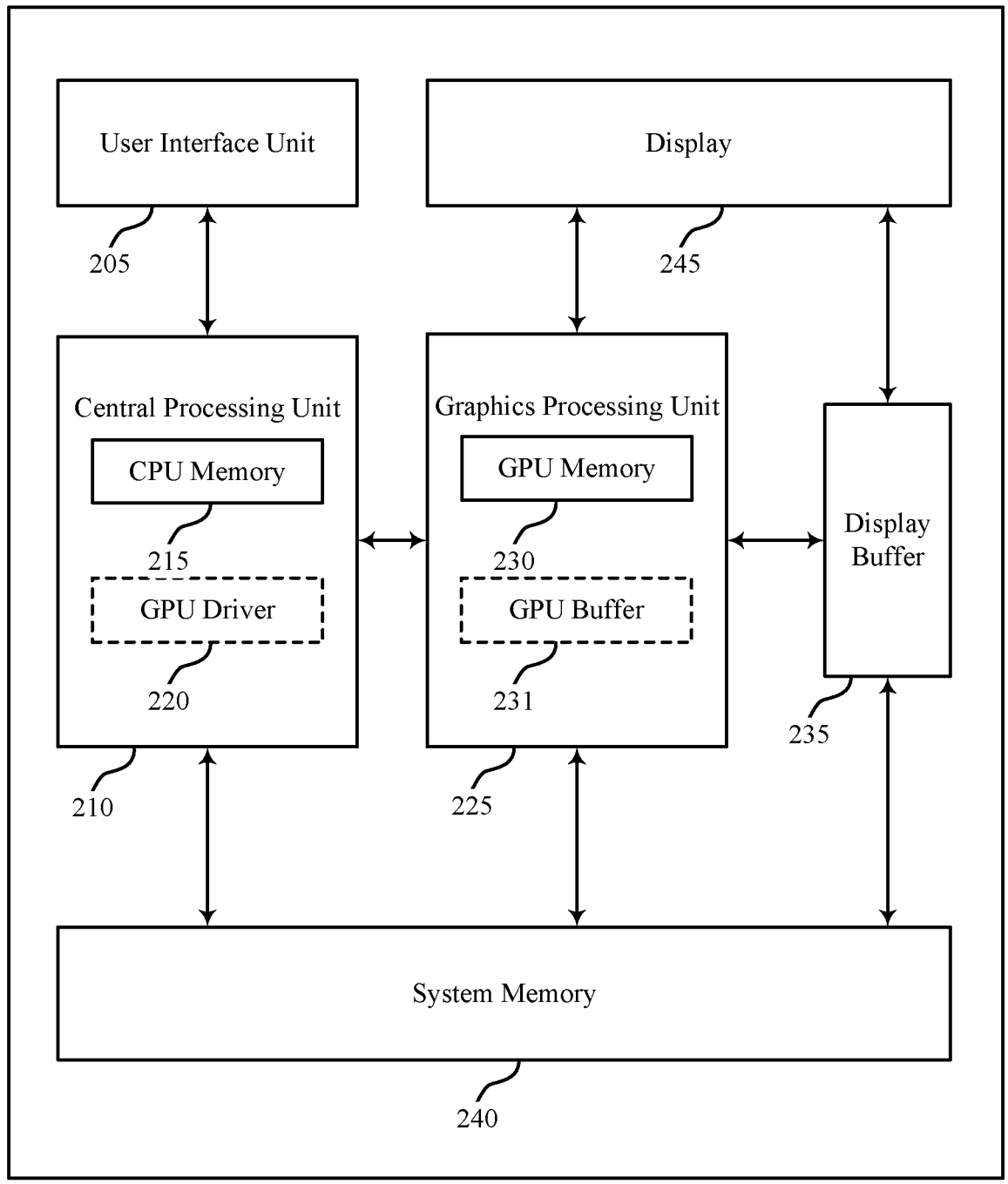
FIG. 2 illustrates an example of a device that supports techniques for flexible rendering operations in accordance with aspects of the present disclosure.

FIG. 2 illustrates an example of a device 200 that supports techniques for flexible rendering operations in accordance with various aspects of the present disclosure. In some cases, the device 200 may implement aspects of adaptive dispatch techniques for flexible rendering operations performed as described with reference to FIG. 1. Examples of the device 200 include, but are not limited to, wireless devices, mobile or cellular telephones, including smartphones, personal digital assistants (PDAs), video gaming consoles that include video displays, mobile video gaming devices, mobile video conferencing units, laptop computers, desktop computers, televisions set-top boxes, tablet computing devices, e-book readers, fixed or mobile media players, and the like.

In the example of FIG. 2, the device 200 includes a central processing unit (CPU) 210 having a CPU memory 215, a GPU 225 having a GPU memory 230 (also referred to herein as a GMEM), a display 245, a display buffer 235 storing data associated with rendering, a user interface unit 205, and a system memory 240. For example, the system memory 240 may store a GPU driver 220 (illustrated as being contained within the CPU 210 as described below) having a compiler, a GPU program, a locally-compiled GPU program, and the like. A user interface unit 205, a CPU 210, a GPU 225, a system memory 240, and a display 245 may communicate with each other (e.g., using a system bus).

Examples of the CPU 210 include, but are not limited to, a digital signal processor (DSP), general purpose microprocessor, ASIC, FPGA, or other equivalent integrated or discrete logic circuitry. Although the CPU 210 and the GPU 225 are illustrated as separate units in the example of FIG. 2, in some examples, the CPU 210 and the GPU 225 may be integrated into a single unit. The CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via the display 245. As illustrated, the CPU 210 may include a CPU memory 215. For example, the CPU memory 215 may represent on-chip storage or memory used in executing machine or object code. The CPU memory 215 may include one or more volatile or non-volatile memories or storage devices, such as flash memory, a magnetic data media, an optical storage media, etc. The CPU 210 may be able to read values from or write values to the CPU memory 215 more quickly than reading values from or writing values to the system memory 240, which may be accessed, e.g., over a system bus.

The GPU 225 may represent one or more dedicated processors for performing graphical operations. That is, for example, the GPU 225 may be a dedicated hardware unit having fixed function and programmable components for rendering graphics and executing GPU applications. The GPU 225 may also include a DSP, a general purpose microprocessor, an ASIC, an FPGA, or other equivalent integrated or discrete logic circuitry. The GPU 225 may be built with a highly-parallel structure that provides more efficient processing of complex graphic-related operations than the CPU 210. For example, the GPU 225 may include a plurality of processing elements that are configured to operate on multiple vertices or pixels in a parallel manner. The highly parallel nature of the GPU 225 may allow the GPU 225 to generate graphic images (e.g., graphical user interfaces and two-dimensional or three-dimensional graphics scenes) for the display 245 more quickly than the CPU 210.

The GPU 225 may, in some instances, be integrated into a motherboard of the device 200. In other instances, the GPU 225 may be present on a graphics card that is installed in a port in the motherboard of the device 200 or may be otherwise incorporated within a peripheral device configured to interoperate with the device 200. As illustrated, the GPU 225 may include a GPU memory 230. For example, the GPU memory 230 may represent on-chip storage or memory used in executing machine or object code. The GPU memory 230 may include one or more volatile or non-volatile memories or storage devices, such as flash memory, a magnetic data media, an optical storage media, etc. The GPU 225 may be able to read values from or write values to the GPU memory 230 more quickly than reading values from or writing values to the system memory 240, which may be accessed, e.g., over a system bus. That is, the GPU 225 may read data from and write data to the GPU memory 230 without using the system bus to access off-chip memory. This operation may allow the GPU 225 to operate in a more efficient manner by reducing the need for the GPU 225 to read and write data via the system bus, which may experience heavy bus traffic.

The GPU buffer 231 may be part of the GPU memory 230. The GPU driver 220 may generate and dispatch commands (e.g., clear commands as described herein) to the GPU buffer 231. The device 200 may identify a set of GPU states of the GPU 225. The set of GPU states may include one or more of a GPU render state or a GPU clear state that corresponds to a set of commands for clearing the GPU buffer 231. The device 200 (e.g., the GPU driver 220) may monitor one or more of the GPU render state or the GPU clear state during a duration. The device 200 may determine, based on the monitoring, an execution of a command of the set of commands for clearing the GPU buffer 231 during the duration, where the command is common to at least two GPU operations for clearing the GPU buffer 231.

The device 200 may process the command based at least in part on the determining. In some cases, the device 200 (e.g., the GPU 225) may drop (e.g., skip execution of) the command based on determining the command has previously been executed during the duration. For example, where the command is associated with a GPU operation, the device 200 (e.g., the GPU 225) may skip execution of the command based on determining the command has already been executed by the device 200 (e.g., by the GPU 225) in another GPU operation (e.g., in a clear on resolve operation). In some other cases, the device 200 (e.g., the GPU driver 220) may modify a portion of the command based on determining the command has not been executed. The device 200 (e.g., the GPU 225) may execute at least the modified portion of the command. For example, where the GPU clear command is associated with a GPU operation, the device 200 (e.g., the GPU driver 220) may modify a portion of the command based on determining the command has not been executed by the GPU 225 in another GPU operation (e.g., in a clear on resolve operation).

The display 245 represents a unit capable of displaying video, images, text or any other type of data for consumption by a viewer. The display 245 may include a liquid-crystal display (LCD), a light emitting diode (LED) display, an organic LED (OLED), an active-matrix OLED (AMOLED), or the like. The display buffer 235 represents a memory or storage device dedicated to storing data for presentation of imagery, such as computer-generated graphics, still images, video frames, or the like for the display 245. The display buffer 235 may represent a two-dimensional buffer that includes a plurality of storage locations. The number of storage locations within the display buffer 235 may, in some cases, generally correspond to the number of pixels to be displayed on the display 245. For example, if the display 245 is configured to include 640×480 pixels, the display buffer 235 may include 640×480 storage locations storing pixel color and intensity information, such as red, green, and blue pixel values, or other color values. The display buffer 235 may store the final pixel values for each of the pixels processed by the GPU 225. The display 245 may retrieve the final pixel values from the display buffer 235 and display the final image based on the pixel values stored in the display buffer 235. The user interface unit 205 represents a unit with which a user may interact with or otherwise interface to communicate with other units of the device 200, such as the CPU 210. Examples of the user interface unit 205 include, but are not limited to, a trackball, a mouse, a keyboard, and other types of input devices. The user interface unit 205 may also be, or include, a touch screen and the touch screen may be incorporated as part of the display 245.

The system memory 240 may include one or more computer-readable storage media. Examples of system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. The system memory 240 may store program components and/or instructions that are accessible for execution by the CPU 210. Additionally, the system memory 240 may store user applications and application surface data associated with the applications. The system memory 240 may, in some cases, store information for use by and/or information generated by other components of the device 200. For example, the system memory 240 may act as a device memory for the GPU 225 and may store data to be operated on by the GPU 225 as well as data resulting from operations performed by the GPU 225

The system memory 240 may include instructions that cause the CPU 210 or the GPU 225 to perform the functions ascribed to the CPU 210 or the GPU 225 in aspects of the present disclosure. The system memory 240 may, in some examples, be considered as a non-transitory storage medium. The term "non-transitory" should not be interpreted to mean that the system memory 240 is non-movable. As one example, the system memory 240 may be removed from the device 200 and moved to another device. As another example, a system memory substantially similar to the system memory 240 may be inserted into the device 200. In certain examples, a non-transitory storage medium may store data that can, over time, change (e.g., in RAM).

The system memory 240 may store the GPU driver 220 and compiler, a GPU program, and a locally-compiled GPU program. The GPU driver 220 may represent a computer program or executable code that provides an interface to access the GPU 225. The CPU 210 may execute the GPU driver 220 or portions thereof to interface with the GPU 225 and, for this reason, the GPU driver 220 is shown in the example of FIG. 2 within the CPU 210. The GPU driver 220 may be accessible to programs or other executables executed by the CPU 210, including the GPU program stored in the system memory 240. Thus, when one of the software applications executing on the CPU 210 is in need of graphics processing, the CPU 210 may provide graphics commands and graphics data to the GPU 225 for rendering to the display 245 (e.g., via the GPU driver 220).

The GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of the GPU 225 to execute commands without user knowledge as to the specifics of the hardware components. In order to process the graphics rendering instructions, the CPU 210 may issue one or more rendering commands to the GPU 225 (e.g., through the GPU driver 220) to cause the GPU 225 to perform some or all of the rendering of the graphics data. In some examples, the graphics data to be rendered may include a list of graphics primitives (e.g., points, lines, triangles, quadrilaterals, etc.).

The GPU program stored in the system memory 240 may invoke or otherwise include one or more functions provided by the GPU driver 220. The CPU 210 generally executes the program in which the GPU program is embedded and, upon encountering the GPU program, passes the GPU program to the GPU driver 220. The CPU 210 executes GPU driver 220 in this context to process the GPU program. That is, for example, the GPU driver 220 may process the GPU program by compiling the GPU program into object or machine code executable by the GPU 225. This object code may be referred to as a locally-compiled GPU program. In some examples, a compiler associated with the GPU driver 220 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, the CPU 210 and the GPU 225).

In the example of FIG. 2, the compiler may receive the GPU program from CPU 210 when executing HL code that includes the GPU program. That is, a software application being executed by the CPU 210 may invoke the GPU driver 220 (e.g., via a graphics API) to issue one or more commands to the GPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to the GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), the GPU driver 220 may formulate one or more commands that specify one or more operations for the GPU 225 to perform in order to render the primitive. When the GPU 225 receives a command from the CPU 210, it may decode the command and configure one or more processing elements to perform the specified operation and may output the rendered data to the display buffer 235.

The GPU 225 generally receives the locally-compiled GPU program, and then, in some instances, the GPU 225 renders one or more images and outputs the rendered images to the display buffer 235. For example, the GPU 225 may generate a number of primitives to be displayed at the display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by the GPU 225 for display as an image (or frame in the context of video data) via the display 245. The GPU 225 may transform primitives and other attributes (e.g., that define a color, texture, lighting, camera configuration, or other aspect) of the primitives into a so-called "world space" by applying one or more model transforms (which may also be specified in the state data). Once transformed, the GPU 225 may apply a view transform for the active camera (which again may also be specified in the state data defining the camera) to transform the coordinates of the primitives and lights into the camera or eye space. The GPU 225 may also perform vertex shading to render the appearance of the primitives in view of any active lights. The GPU 225 may perform vertex shading in one or more of the above model, world, or view space.

Once the primitives are shaded, the GPU 225 may perform projections to project the image into a canonical view volume. After transforming the model from the eye space to the canonical view volume, the GPU 225 may perform clipping to remove any primitives that do not at least partially reside within the canonical view volume. That is, the GPU 225 may remove any primitives that are not within the frame of the camera. The GPU 225 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, the GPU 225 may then rasterize the primitives. Generally, rasterization may refer to the task of taking an image described in a vector graphics format and converting it to a raster image (e.g., a pixelated image) for output on a video display or for storage in a bitmap file format.

A GPU 225 may include a dedicated fast bin buffer (e.g., a fast memory buffer, such as GMEM, which may be referred to by the GPU memory 230). As discussed herein, a rendering surface may be divided into bins. In some cases, the bin size is determined by format (e.g., pixel color and depth information) and render target resolution divided by the total amount of GMEM. The number of bins may vary based on the device 200 hardware, target resolution size, and target display format. A rendering pass may draw (e.g., render, write, etc.) pixels into GMEM (e.g., with a high bandwidth that matches the capabilities of the GPU). The GPU 225 may then resolve the GMEM (e.g., burst write blended pixel values from the GMEM, as a single layer, to the display buffer 235 or a frame buffer in the system memory 240). Such may be referred to as bin-based or tile-based rendering. When all bins are complete, the driver may swap buffers and start the binning process again for a next frame. For example, the GPU 225 may implement a tile-based architecture that renders an image or rendering target by breaking the image into multiple portions, referred to as tiles or bins. The bins may be sized based on the size of the GPU memory 230 (e.g., which may alternatively be referred to herein as GMEM or a cache), the resolution of the display 245, the color or Z precision of the render target, etc. When implementing tile-based rendering, the GPU 225 may perform a binning pass and one or more rendering passes. For example, with respect to the binning pass, the GPU 225 may process an entire image and sort rasterized primitives into bins.

Figure 3:
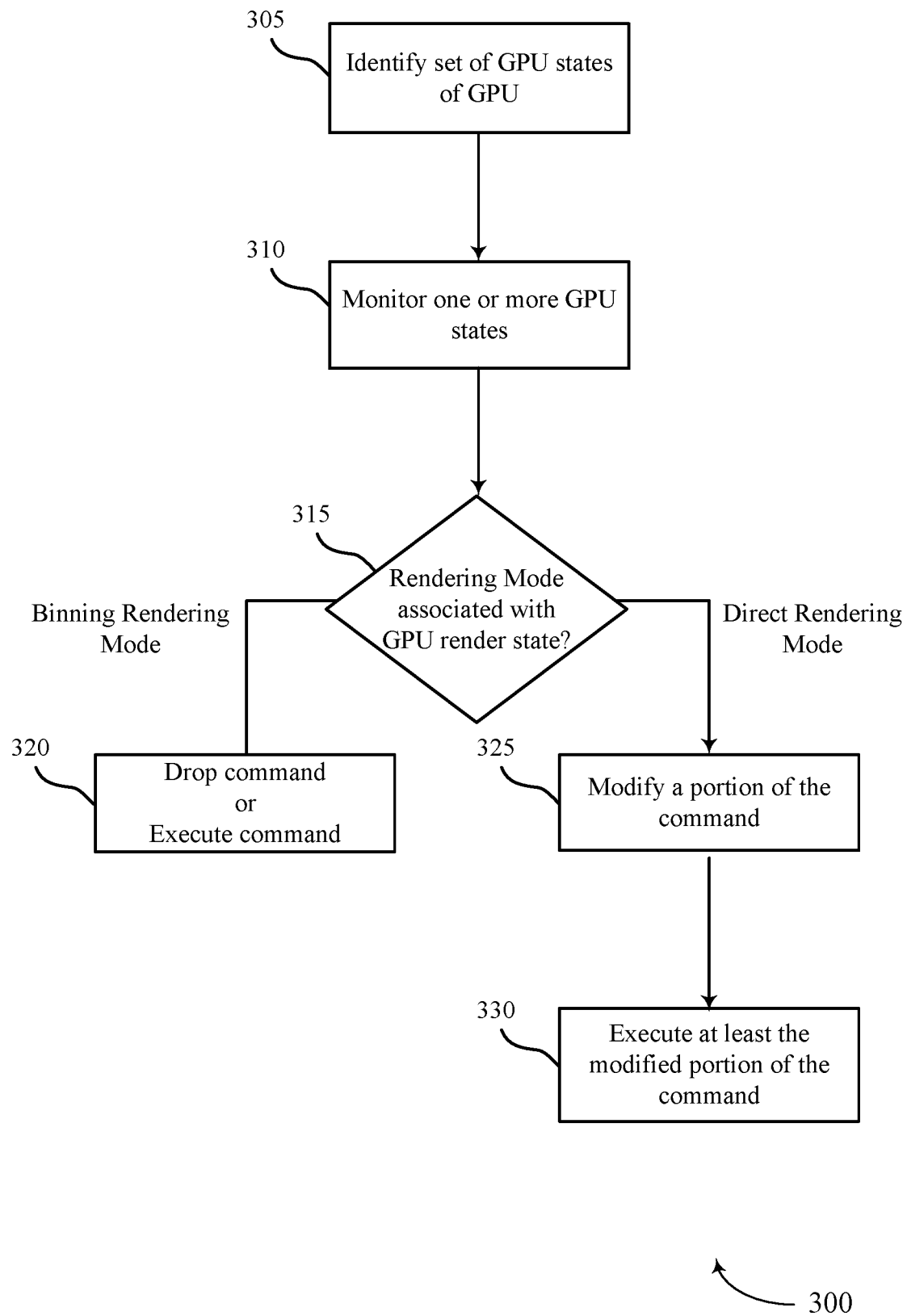
FIG. 3 illustrates an example of a method that supports techniques for flexible rendering operations in accordance with aspects of the present disclosure.

FIG. 3 illustrates an example of a method 300 that supports techniques for flexible rendering operations in accordance with aspects of the present disclosure. The operations of method 300 may be implemented by a device (e.g., a device 105, a device 200, etc.) or its components as described herein. For example, the operations of method 300 may be performed by a GPU as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 305, the device may identify a set of GPU states of a GPU of the device. The set of GPU states may include one or more of a GPU render state or a GPU clear state that corresponds to a set of commands for clearing a GPU buffer of the GPU. At 310, the device may monitor one or more GPU states. For example, the device may monitor one or more of the GPU render state or the GPU clear state during a duration. The device may monitor one or more of the GPU render state or the GPU clear state during a GPU cycle.

At 315, based on monitoring the GPU render state, the device may determine a render mode associated with the GPU render state. For example, the device may determine whether the render mode is a binning render mode or a direct render mode. In some aspects, the device may determine the render mode, at 310, during the monitoring of the one or more GPU states. In some examples, the device may determine, based on the monitoring, at 310, an execution of a command of the set of commands for clearing the GPU buffer during the duration, where the command is common to at least two GPU operations for clearing the GPU buffer. For example, the device may determine whether the command has previously been executed during the duration. The device may process the command based on the determining. In some aspects, the device may process the command based on the render mode (e.g., binning render mode or a direct render mode) determined at 315. For example, the device may process the command according to the examples at 320 or the examples at 325 and 330 described herein.

At 320, the device may drop (e.g., skip execution of) the command based on determining the command has previously been executed during the duration during which the device monitored one or more GPU states. For example, where the command is associated with a GPU operation, the device may skip execution of the command based on determining the command has already been executed by the GPU in another GPU operation (e.g., in a clear on resolve operation). For a clear command associated with a binning rendering mode, the device may determine that the clear command was already executed. For example, the device may determine a clear on resolve was already performed, and that that clear on resolve is still valid. The device may drop (e.g., skip execution of) the clear command.

Alternatively at 320, the device may execute the command based on determining the command has not previously been executed. For example, the device may determine that the clear command was not yet executed. The device may execute the clear command based on a set of rendering boundaries. In some examples, executing the clear command may include clearing the GPU buffer based on a set of rendering boundaries. For example, executing the clear command may include intersecting a rectangle associated with the clear command with a window offset (scissor) and clearing the GPU memory.

At 325, the device may modify a portion of the command based on determining the command has not been executed. For example, where the GPU clear command is associated with a GPU operation, the device may modify a portion of the command based on determining the command has not been executed by the GPU in another GPU operation (e.g., in a clear on resolve operation). In some aspects, the device may modify the portion of the command based on clear parameters associated with the command. The device may determine the clear parameters based on one or more of the GPU render state or the GPU clear state monitored at 310.

At 330, the device may execute at least the modified portion of the command. For a clear command associated with a direct rendering mode, the device may determine that the clear command was already executed. For example, the device may determine a clear on resolve was already performed, and that that clear on resolve is still valid. The device may drop (e.g., skip execution of) the clear command.

The device may align two or more bins associated with the GPU buffer and clear the GPU buffer based on the alignment. For example, when the device determines that the clear is aligned (e.g., confirms bin alignment), a flag buffer is allocated to the clear, and hardware of the device is capable of performing a fast clear (e.g., a full image clear), the device may clear the GPU buffer by writing a clear value to the flag buffer. In another example, when the device 105 determines that the clear is aligned (e.g., confirms bin alignment), but that no flag buffer is allocated to the clear, the device may clear the GPU buffer using a system memory clear (e.g., CCU-style). In another example, when the device determines that the clear is not aligned (e.g., confirms bin misalignment), the device may clear the GPU buffer using an unaligned clear having a relatively slower processing time.

The clear commands described herein may be implemented using indirect buffers (e.g., an IB2). An indirect buffer may include commands for various aspects of a rendering pipeline. For example, an indirect buffer may include preamble commands that are executable by a GPU, such as commands that initialize a static state of the GPU and set the initial rendering state of the GPU. A rendering state of the GPU may include GPU settings that may be updated based on application type. In a clear indirect buffer, the device may program or configure the following: clear color, scissor/clear rectangle (e.g., a clear region), a format associated with clear commands, a system memory base address, a flag buffer base address, and a GPU memory (GMEM) base address (e.g., if MEM is allocated). Outside the clear indirect buffer, the device may program or configure the following: rendering mode (e.g., (binning rendering mode, direct rendering mode), bin width/height (for the binning rendering mode), window offset (for the binning rendering mode), and window scissor (for the binning rendering mode).

Accordingly, aspects of the techniques described herein may provide for hardware based optimization of clear commands with clear state (e.g., clear region, clear color, etc.). A hardware state machine may track a GPU render state and a GPU clear state and issue (or not issue) hardware optimized clear commands with minimal software overhead (e.g., minimal software overhead at a GPU driver). The techniques may further include additional rendering commands such as draws. The techniques may include resolve operations such as writing GMEM to a system and clearing GMEM for cases of binning.

Figure 4:
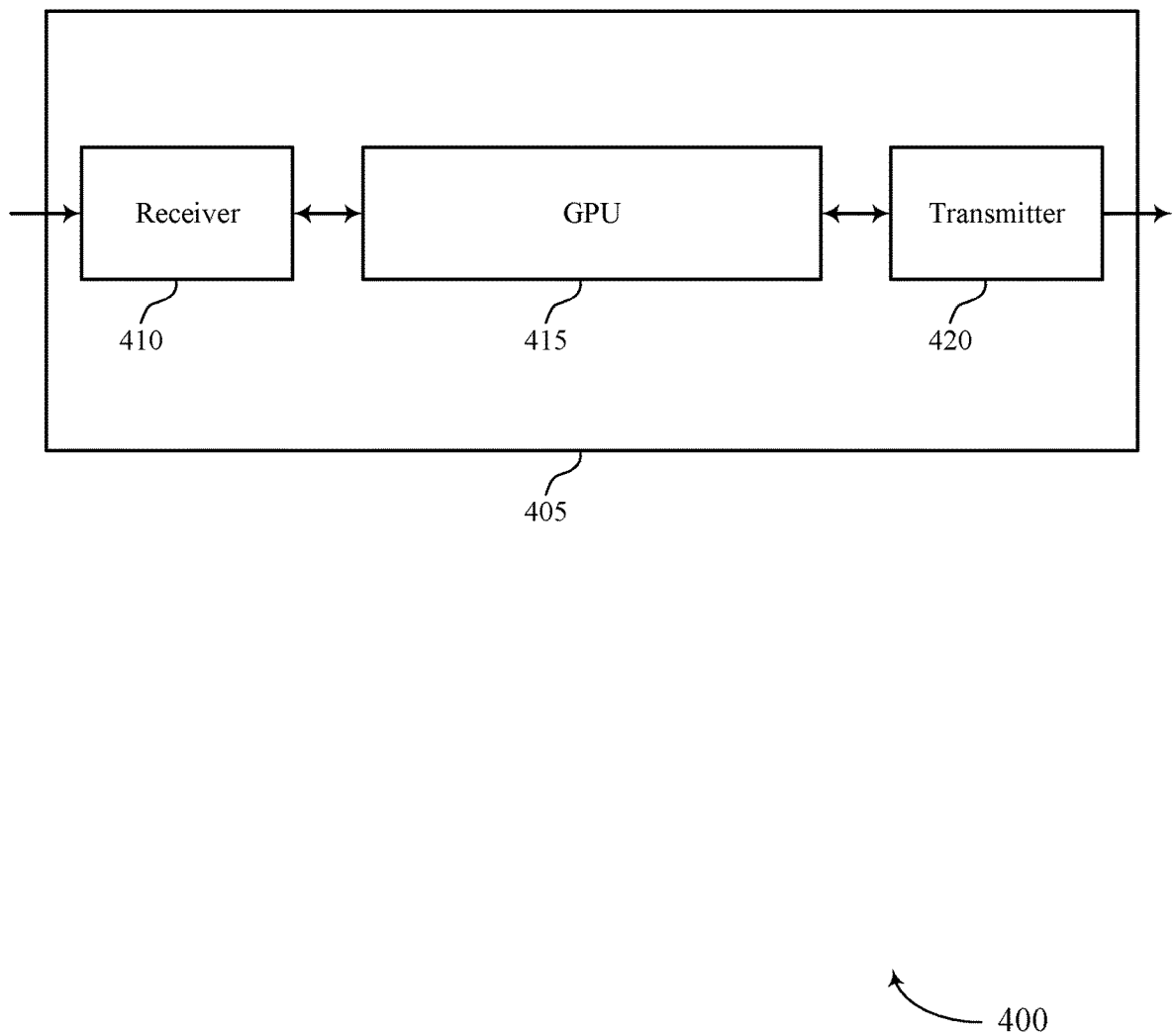
FIGS. 4 and 5 show block diagrams of devices that support techniques for flexible rendering operations in accordance with aspects of the present disclosure.

FIG. 4 shows a block diagram 400 of a device 405 that supports techniques for flexible rendering operations in accordance with aspects of the present disclosure. The device 405 may be an example of aspects of a device as described herein. The device 405 may include a receiver 410, a GPU 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to flexible rendering operations, etc.). Information may be passed on to other components of the device 405. The receiver 410 may be an example of aspects of the transceiver 720 described with reference to FIG. 7. The receiver 410 may utilize a single antenna or a set of antennas.

The GPU 415 may identify a set of GPU states of the GPU 415 of the device 405, where the set of GPU states includes one or more of a GPU render state or a GPU clear state that corresponds to a set of commands for clearing a GPU buffer of the GPU 415. The GPU 415 may monitor one or more of the GPU render state or the GPU clear state during a duration, and determine, based on the monitoring, an execution of a command of the set of commands for clearing the GPU buffer during the duration, where the command is common to at least two GPU operations for clearing the GPU buffer. The GPU 415 may process the command based on determining. The GPU 415 may be an example of aspects of the GPU 710 described herein.

The GPU 415, or its sub-components, may be implemented in hardware, code (e.g., software or firmware) executed by a processor, or any combination thereof. If implemented in code executed by a processor, the functions of the GPU 415, or its sub-components may be executed by a general-purpose processor, a DSP, ASIC, a FPGA or other programmable logic device, discrete gate or transistor logic, discrete hardware components, or any combination thereof designed to perform the functions described in the present disclosure.

The GPU 415, or its sub-components, may be physically located at various positions, including being distributed such that portions of functions are implemented at different physical locations by one or more physical components. In some examples, the GPU 415, or its sub-components, may be a separate and distinct component in accordance with various aspects of the present disclosure. In some examples, the GPU 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
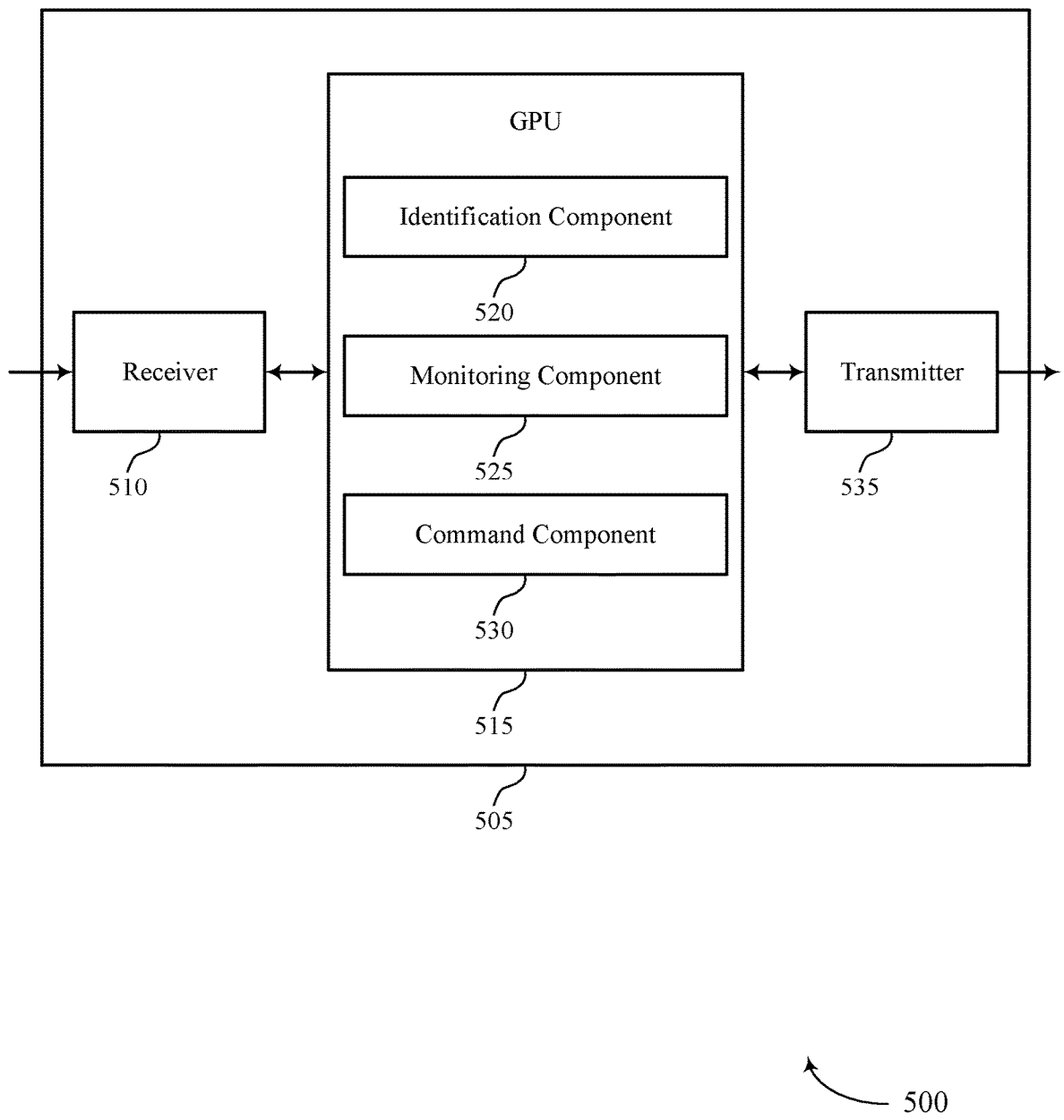

FIG. 5 shows a block diagram 500 of a device 505 that supports techniques for flexible rendering operations in accordance with aspects of the present disclosure. The device 505 may be an example of aspects of a device 405 or a device 115 as described herein. The device 505 may include a receiver 510, a GPU 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to flexible rendering operations, etc.). Information may be passed on to other components of the device 505. The receiver 510 may be an example of aspects of the transceiver 720 described with reference to FIG. 7. The receiver 510 may utilize a single antenna or a set of antennas.

The GPU 515 may be an example of aspects of the GPU 415 as described herein. The GPU 515 may include an identification component 520, a monitoring component 525, and a command component 530. The GPU 515 may be an example of aspects of the GPU 710 described herein. The identification component 520 may identify a set of GPU states of a the GPU 515 of the device 505, where the set of GPU states includes one or more of a GPU render state or a GPU clear state that corresponds to a set of commands for clearing a GPU buffer of the GPU 515. The monitoring component 525 may monitor one or more of the GPU render state or the GPU clear state during a duration. The command component 530 may determine, based on the monitoring, an execution of a command of the set of commands for clearing the GPU buffer during the duration, where the command is common to at least two GPU operations for clearing the GPU buffer and process the command based on determining.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
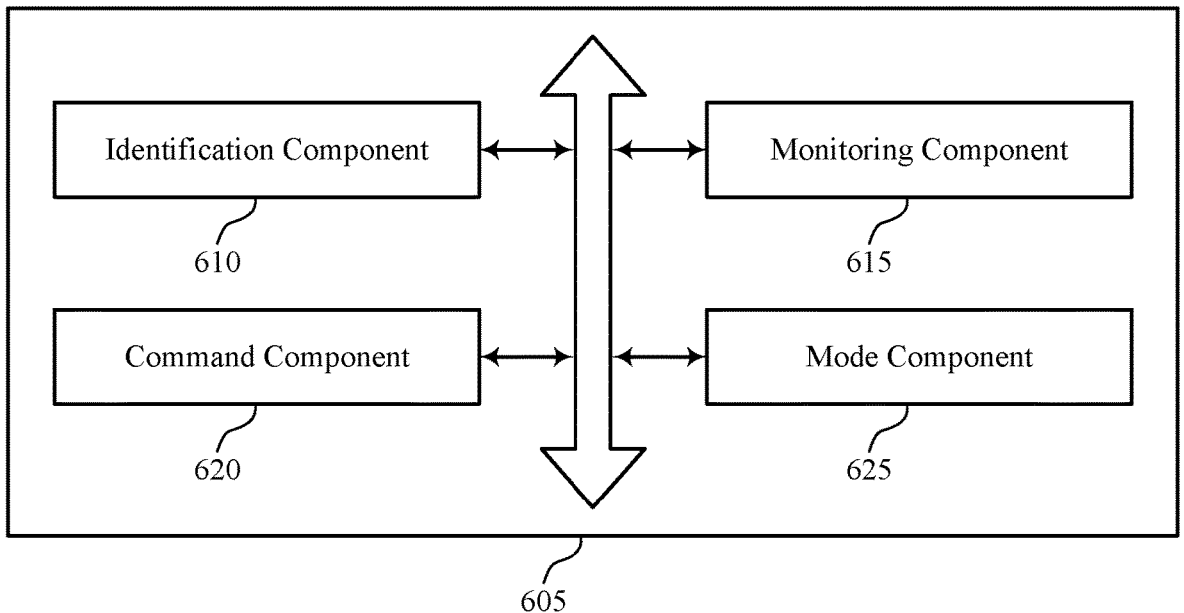
FIG. 6 shows a block diagram of a GPU that supports techniques for flexible rendering operations in accordance with aspects of the present disclosure.

FIG. 6 shows a block diagram 600 of a GPU 605 that supports techniques for flexible rendering operations in accordance with aspects of the present disclosure. The GPU 605 may be an example of aspects of a GPU 415, a GPU 515, or a GPU 710 described herein. The GPU 605 may include an identification component 610, a monitoring component 615, a command component 620, and a mode component 625. Each of these components may communicate, directly or indirectly, with one another (e.g., via one or more buses).

The identification component 610 may identify a set of GPU states of the GPU 605, where the set of GPU states includes one or more of a GPU render state or a GPU clear state that corresponds to a set of commands for clearing a GPU buffer of the GPU 605. The monitoring component 615 may monitor one or more of the GPU render state or the GPU clear state during a duration. The command component 620 may determine, based on the monitoring, an execution of a command of the set of commands for clearing the GPU buffer during the duration, where the command is common to at least two GPU operations for clearing the GPU buffer.

In some examples, the command component 620 may process the command based on determining. In some examples, the command component 620 may determine a previous execution of the command during the duration, where processing the command is based on determining the previous execution of the command during the duration. In some examples, the command component 620 may drop the command based on determining the previous execution of the command during the duration. In some examples, the command component 620 may clear the GPU buffer based on determining a set of rendering boundaries. In some examples, the command component 620 may clear the GPU 605 based on aligning two or more bins associated with the GPU buffer.

In some examples, the command component 620 may determine a nonexecution of the command during the duration, where processing the command is based on determining the nonexecution of the command during the duration. In some examples, the command component 620 may modify a portion of the command based on determining the nonexecution of the command during the duration. In some examples, the command component 620 may execute at least the modified portion of the command. In some examples, the command component 620 may determine a set of clear parameters associated with the set of commands for clearing the GPU buffer based on one or more of the GPU render state or the GPU clear state, where modifying the portion of the command is based on the set of clear parameters.

In some examples, the command component 620 may determine a clear command type associated with the command, where processing the command is based on the clear command type. In some cases, the set of commands for clearing the GPU buffer include one or more of a clear region, a clear color, or a format associated with clearing the GPU buffer. In some cases, the at least two GPU operations for clearing the GPU buffer include a clear on resolve operation. The mode component 625 may determine a render mode associated with the GPU render state, the render mode including a binning render mode or a direct render mode, where processing the command is based on the render mode.

Figure 7:
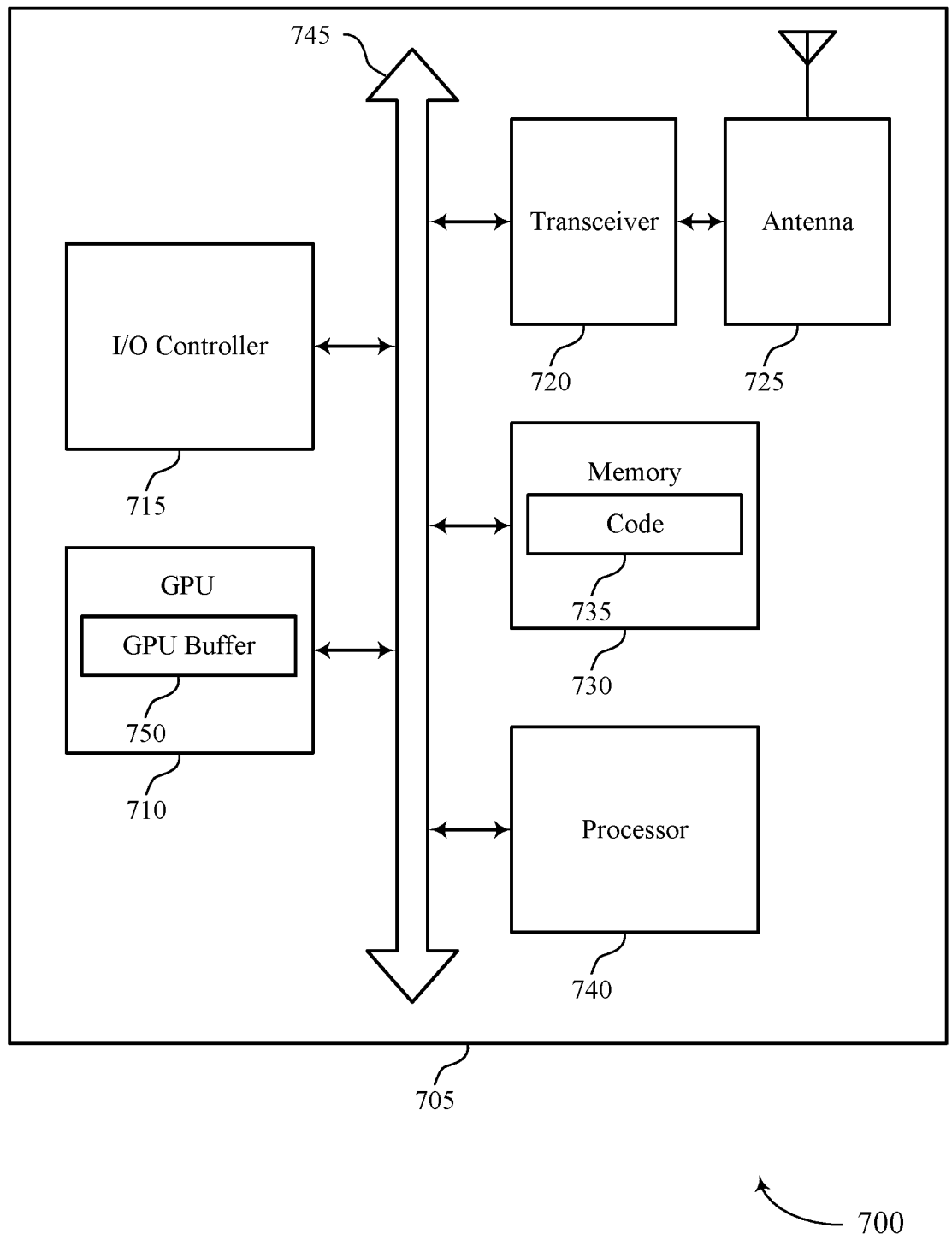
FIG. 7 shows a diagram of a system including a device that supports techniques for flexible rendering operations in accordance with aspects of the present disclosure.

FIG. 7 shows a diagram of a system 700 including a device 705 that supports techniques for flexible rendering operations in accordance with aspects of the present disclosure. The device 705 may be an example of or include the components of device 405, device 505, or a device as described herein. The device 705 may include components for bidirectional voice and data communications including components for transmitting and receiving communications, including a GPU 710, an I/O controller 715, a transceiver 720, an antenna 725, memory 730, a processor 740, and a coding manager 750. These components may be in electronic communication via one or more buses (e.g., bus 745).

The GPU 710 may be configured to operate a memory array (e.g., a GPU buffer 750) using a memory controller. In other cases, a memory controller may be integrated into the GPU 710. The GPU 710 may be configured to execute computer-readable instructions stored in a memory (e.g., the memory 730) to cause the device 705 to perform various functions (e.g., functions or tasks supporting flexible rendering operations). For example, the GPU 710 may identify a set of GPU states of a the GPU 710 of the device 705. The set of GPU states includes one or more of a GPU render state or a GPU clear state that corresponds to a set of commands for clearing a GPU buffer 750 of the GPU 710. The GPU 710 may monitor one or more of the GPU render state or the GPU clear state during a duration, and determine, based on the monitoring, an execution of a command of the set of commands for clearing the GPU buffer 750 during the duration. The command is common to at least two GPU operations for clearing the GPU buffer 750, and process the command based on determining.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor 740 to perform various functions described herein. In some cases, the memory 730 may contain, among other things, a BIOS which may control basic hardware or software operation such as the interaction with peripheral components or devices. The code 735 may include instructions to implement aspects of the present disclosure, including instructions to support processing. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting flexible rendering operations).

Figure 8:
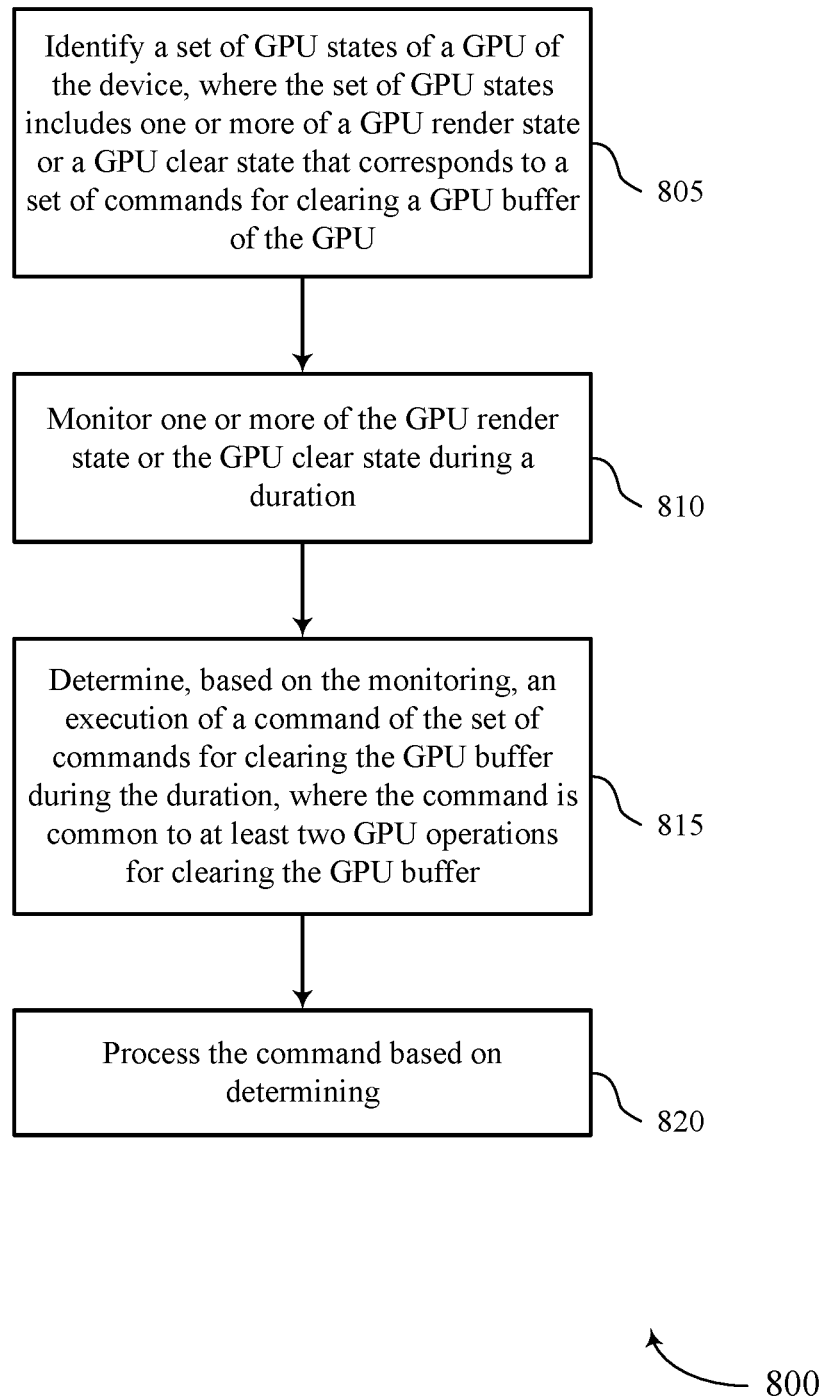
FIGS. 8 and 9 show flowcharts illustrating methods that support techniques for flexible rendering operations in accordance with aspects of the present disclosure.

FIG. 8 shows a flowchart illustrating a method 800 that supports techniques for flexible rendering operations in accordance with aspects of the present disclosure. The operations of method 800 may be implemented by a device or its components as described herein. For example, the operations of method 800 may be performed by a GPU as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the device may identify a set of GPU states of a GPU of the device, where the set of GPU states includes one or more of a GPU render state or a GPU clear state that corresponds to a set of commands for clearing a GPU buffer of the GPU. The operations of 805 may be performed according to the methods described herein. In some examples, aspects of the operations of 805 may be performed by an identification component as described with reference to FIGS. 4 through 7.

At 810, the device may monitor one or more of the GPU render state or the GPU clear state during a duration. The operations of 810 may be performed according to the methods described herein. In some examples, aspects of the operations of 810 may be performed by a monitoring component as described with reference to FIGS. 4 through 7.

At 815, the device may determine, based on the monitoring, an execution of a command of the set of commands for clearing the GPU buffer during the duration, where the command is common to at least two GPU operations for clearing the GPU buffer. The operations of 815 may be performed according to the methods described herein. In some examples, aspects of the operations of 815 may be performed by a command component as described with reference to FIGS. 4 through 7.

At 820, the device may process the command based on determining. The operations of 820 may be performed according to the methods described herein. In some examples, aspects of the operations of 820 may be performed by a command component as described with reference to FIGS. 4 through 7.

Figure 9:
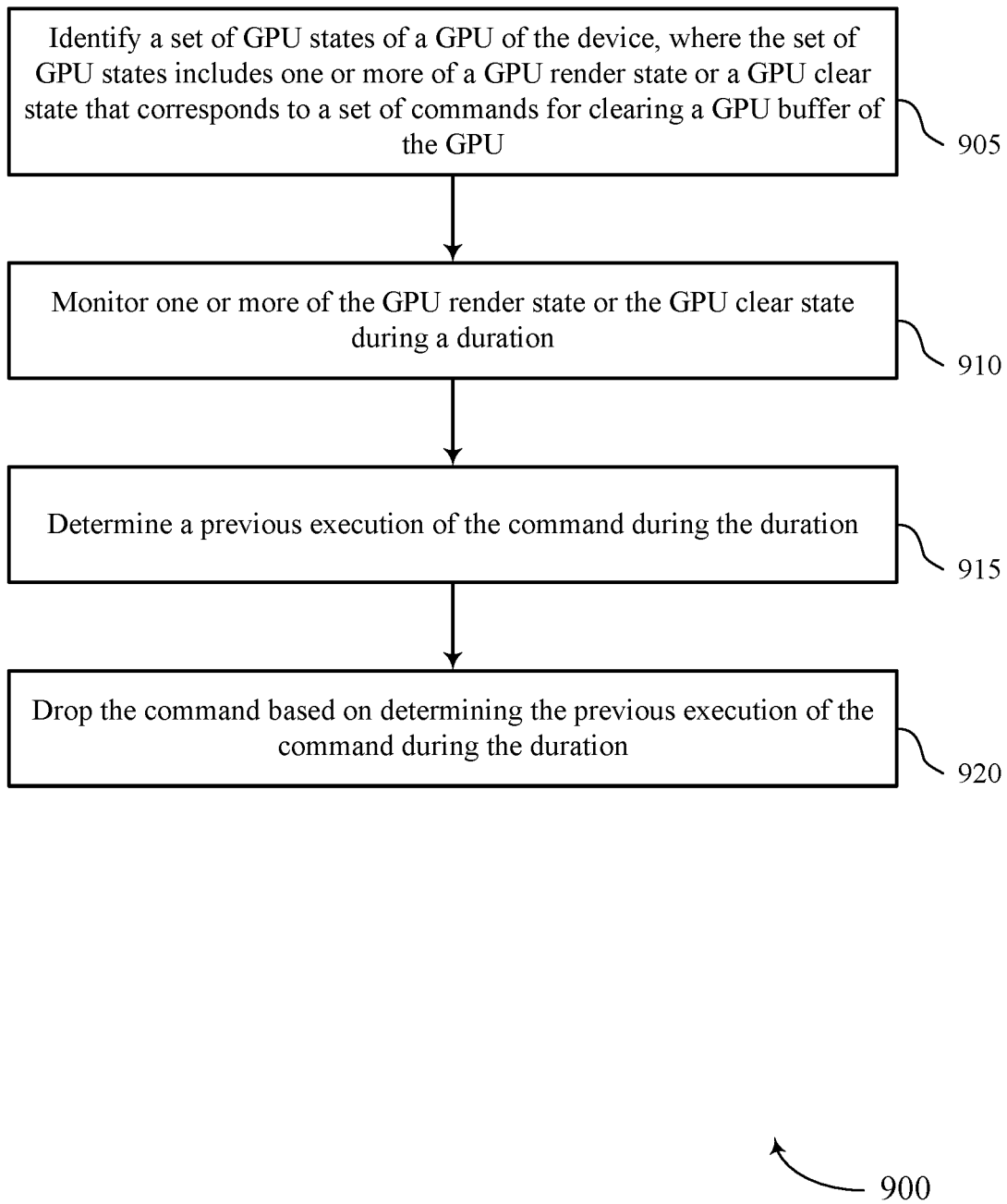

FIG. 9 shows a flowchart illustrating a method 900 that supports techniques for flexible rendering operations in accordance with aspects of the present disclosure. The operations of method 900 may be implemented by a device or its components as described herein. For example, the operations of method 900 may be performed by a GPU as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the device may identify a set of GPU states of a GPU of the device, where the set of GPU states includes one or more of a GPU render state or a GPU clear state that corresponds to a set of commands for clearing a GPU buffer of the GPU. The operations of 905 may be performed according to the methods described herein. In some examples, aspects of the operations of 905 may be performed by an identification component as described with reference to FIGS. 4 through 7.

At 910, the device may monitor one or more of the GPU render state or the GPU clear state during a duration. The operations of 910 may be performed according to the methods described herein. In some examples, aspects of the operations of 910 may be performed by a monitoring component as described with reference to FIGS. 4 through 7.

At 915, the device may determine a previous execution of the command during the duration. The operations of 915 may be performed according to the methods described herein. In some examples, aspects of the operations of 915 may be performed by a command component as described with reference to FIGS. 4 through 7.

At 920, the device may drop the command based on determining the previous execution of the command during the duration. The operations of 920 may be performed according to the methods described herein. In some examples, aspects of the operations of 920 may be performed by a command component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for graphics processor unit operations at a device, comprising:
   identifying a set of graphics processor unit states of a graphics processor unit of the device, wherein the set of graphics processor unit states comprises one or more of a graphics processor unit render state or a graphics processor unit clear state that corresponds to a set of commands for clearing a graphics processor unit buffer of the graphics processor unit;
   monitoring one or more of the graphics processor unit render state or the graphics processor unit clear state during a duration, the duration being a graphics processor unit cycle;
   determining a render mode associated with the graphics processor unit render state, the render mode comprising a binning render mode or a direct render mode;
   determining, based at least in part on the monitoring, an execution of a command of the set of commands for clearing the graphics processor unit buffer during the duration, wherein the command is common to at least two graphics processor unit operations for clearing the graphics processor unit buffer; and
   processing the command based at least in part on the determined execution of the command of the set of commands for clearing the graphics processor unit buffer and the determined render mode.

2. The method of claim 1, wherein determining the execution of the command comprises:
   determining a previous execution of the command during the duration, wherein processing the command is based at least in part on determining the previous execution of the command during the duration.

3. The method of claim 2, wherein processing the command comprises:
   dropping the command based at least in part on determining the previous execution of the command during the duration.

4. The method of claim 1, wherein processing the command comprises:
   clearing the graphics processor unit buffer based at least in part on determining a set of rendering boundaries.

5. The method of claim 1, wherein processing the command comprises:
   clearing the graphics processor unit based at least in part on aligning two or more bins associated with the graphics processor unit buffer.

6. The method of claim 1, wherein determining the execution of the command comprises:
   determining a nonexecution of the command during the duration, wherein processing the command is based at least in part on determining the nonexecution of the command during the duration.

7. The method of claim 6, wherein processing the command comprises:
   modifying a portion of the command based at least in part on determining the nonexecution of the command during the duration; and
   executing at least the modified portion of the command.

8. The method of claim 7, further comprising:
   determining a set of clear parameters associated with the set of commands for clearing the graphics processor unit buffer based at least in part on one or more of the graphics processor unit render state or the graphics processor unit clear state, wherein modifying the portion of the command is based at least in part on the set of clear parameters.

9. The method of claim 1, wherein the set of commands for clearing the graphics processor unit buffer comprise one or more of a clear region, a clear color, or a format associated with clearing the graphics processor unit buffer.

10. The method of claim 1, further comprising:
    determining a clear command type associated with the command, wherein processing the command is based at least in part on the clear command type.

11. The method of claim 1, wherein the at least two graphics processor unit operations for clearing the graphics processor unit buffer comprise a clear on resolve operation.

12. An apparatus for graphics processor unit operations, comprising:
    a processor,
    memory coupled with the processor; and
    instructions stored in the memory and executable by the processor to cause the apparatus to:
      identify a set of graphics processor unit states of a graphics processor unit of the apparatus, wherein the set of graphics processor unit states comprises one or more of a graphics processor unit render state or a graphics processor unit clear state that corresponds to a set of commands for clearing a graphics processor unit buffer of the graphics processor unit;
      monitor one or more of the graphics processor unit render state or the graphics processor unit clear state during a duration, the duration being a graphics processor unit cycle;
      determine a render mode associated with the graphics processor unit render state, the render mode comprising a binning render mode or a direct render mode;
      determine, based at least in part on the monitoring, an execution of a command of the set of commands for clearing the graphics processor unit buffer during the duration, wherein the command is common to at least two graphics processor unit operations for clearing the graphics processor unit buffer; and
      process the command based at least in part on the determined execution of the command of the set of commands for clearing the graphics processor unit buffer and the determined render mode.

13. The apparatus of claim 12, wherein the instructions to determine the execution of the command are executable by the processor to cause the apparatus to:
    determine a previous execution of the command during the duration, wherein the instructions to process the command are further executable by the processor based at least in part on determining the previous execution of the command during the duration.

14. The apparatus of claim 13, wherein the instructions to process the command are executable by the processor to cause the apparatus to:
    drop the command based at least in part on determining the previous execution of the command during the duration.

15. The apparatus of claim 12, wherein the instructions to process the command are executable by the processor to cause the apparatus to:
    clear the graphics processor unit buffer based at least in part on determining a set of rendering boundaries.

16. The apparatus of claim 12, wherein the instructions to process the command are executable by the processor to cause the apparatus to:
    clear the graphics processor unit based at least in part on aligning two or more bins associated with the graphics processor unit buffer.

17. The apparatus of claim 12, wherein the instructions to determine the execution of the command are executable by the processor to cause the apparatus to:

determine a nonexecution of the command during the duration, wherein the instructions to process the command are further executable by the processor based at least in part on determining the nonexecution of the command during the duration.

18. The apparatus of claim 17, wherein the instructions to process the command are executable by the processor to cause the apparatus to:

modify a portion of the command based at least in part on determining the nonexecution of the command during the duration; and execute at least the modified portion of the command.

19. The apparatus of claim 18, wherein the instructions are further executable by the processor to cause the apparatus to:

determine a set of clear parameters associated with the set of commands for clearing the graphics processor unit buffer based at least in part on one or more of the graphics processor unit render state or the graphics processor unit clear state, wherein the instructions to modify the portion of the command are based at least in part on the set of clear parameters.

20. An apparatus for graphics processor unit operations, comprising:

means for identifying a set of graphics processor unit states of a graphics processor unit of the apparatus, wherein the set of graphics processor unit states comprises one or more of a graphics processor unit render state or a graphics processor unit clear state that corresponds to a set of commands for clearing a graphics processor unit buffer of the graphics processor unit;

means for monitoring one or more of the graphics processor unit render state or the graphics processor unit clear state during a duration, the duration being a graphics processor unit cycle;

means for determining a render mode associated with the graphics processor unit render state, the render mode comprising a binning render mode or a direct render mode;

means for determining, based at least in part on the monitoring, an execution of a command of the set of commands for clearing the graphics processor unit buffer during the duration, wherein the command is common to at least two graphics processor unit operations for clearing the graphics processor unit buffer; and means for processing the command based at least in part on the determined execution of the command of the set of commands for clearing the graphics processor unit buffer and the determined render mode.

\* \* \* \* \*